Dec. 18, 1934.  T. W. HARRINGTON  1,984,741
FLOAT OPERATED VALVE FOR OIL WELLS
Filed March 28, 1933  3 Sheets-Sheet 1
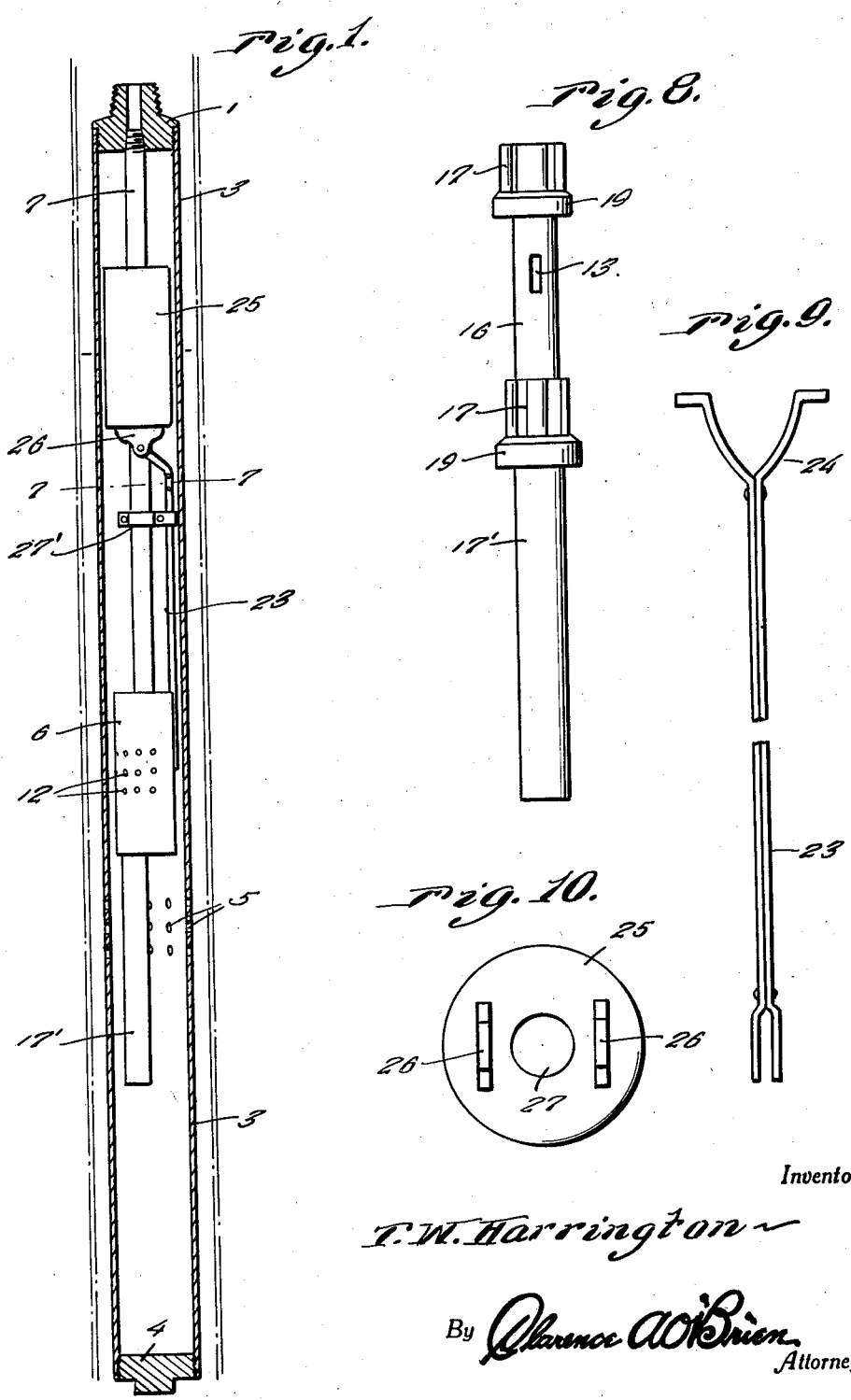
Inventor
T. W. Harrington
By Clarence A. O'Brien
Attorney

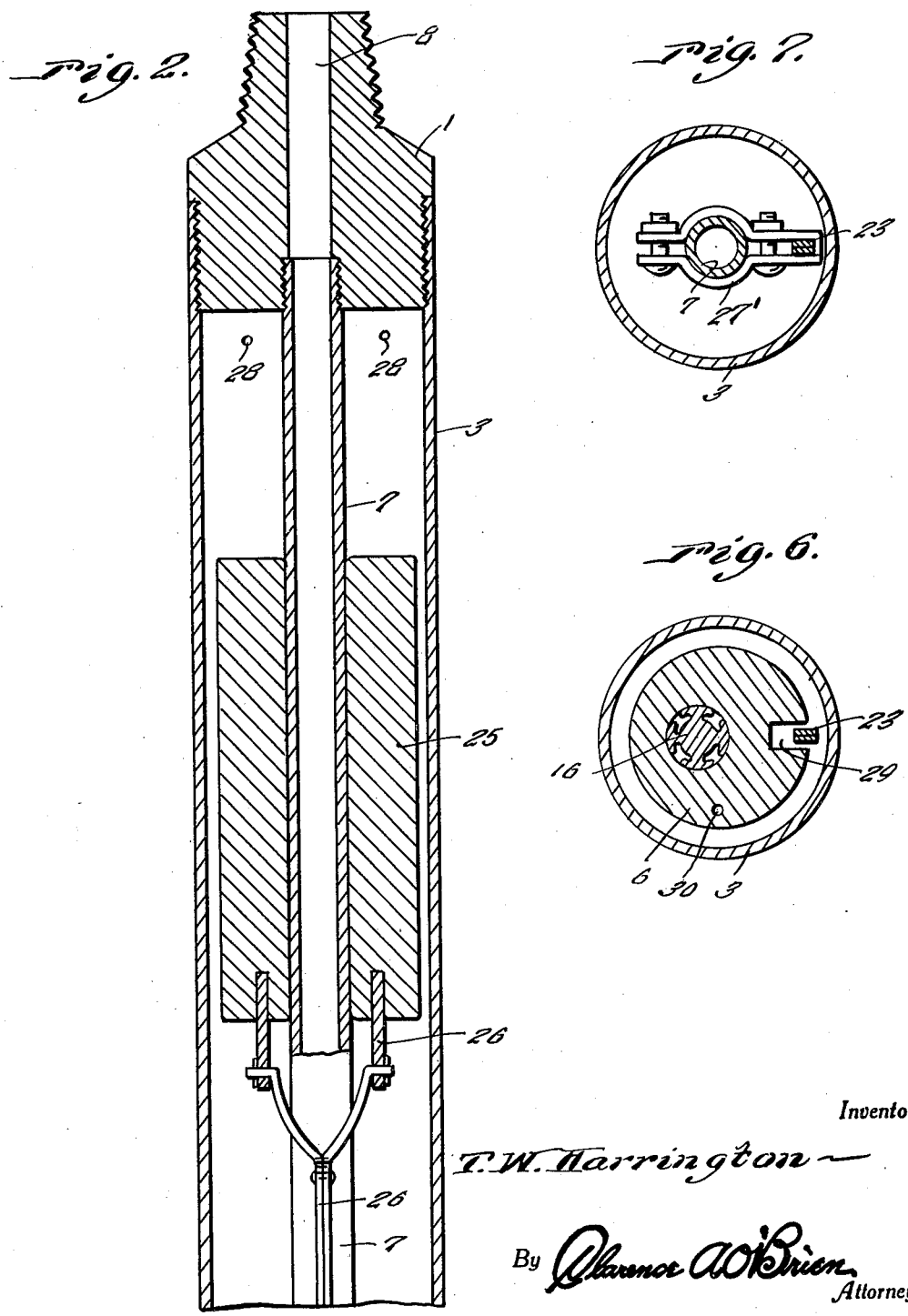

Dec. 18, 1934.  T. W. HARRINGTON  1,984,741
FLOAT OPERATED VALVE FOR OIL WELLS
Filed March 28, 1933   3 Sheets-Sheet 3
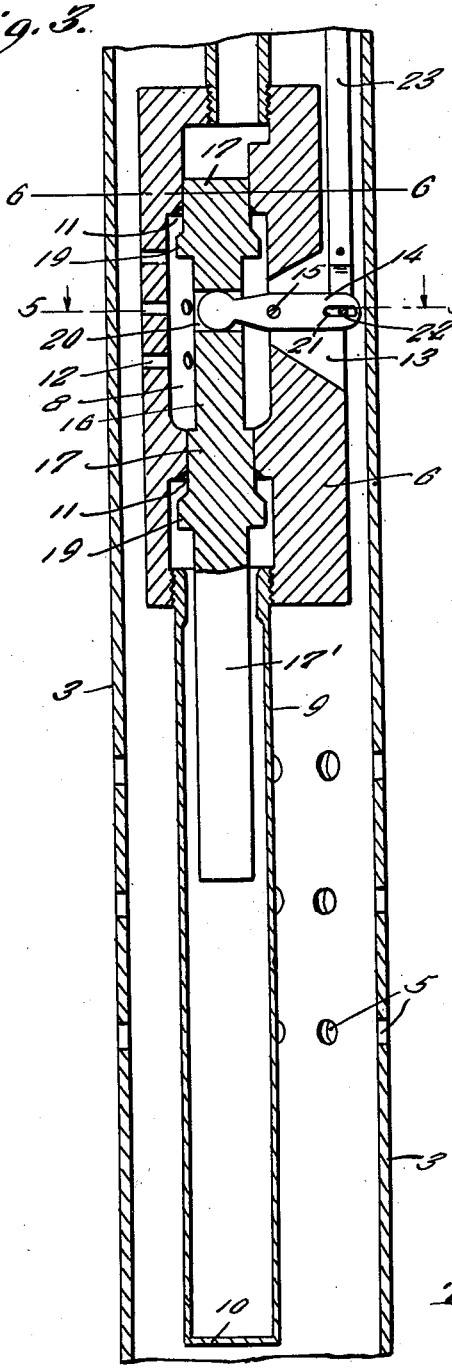
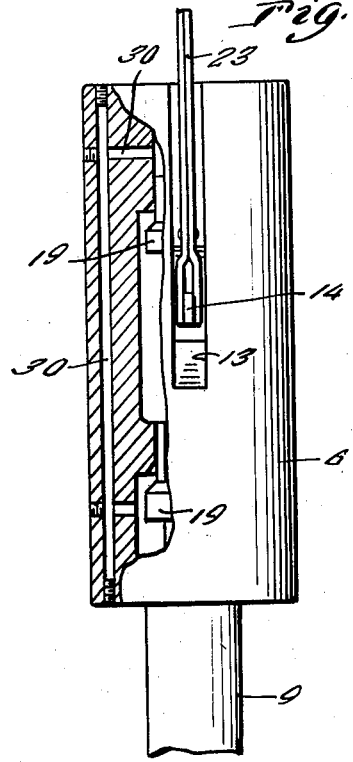
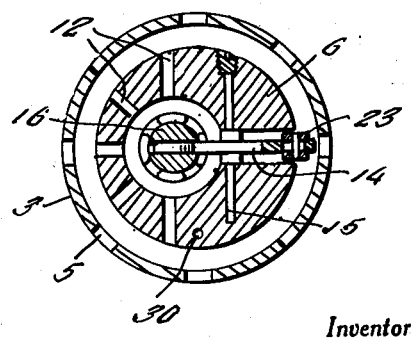
Inventor
T. W. Harrington
By Clarence A. O'Brien
Attorney Patented Dec. 18, 1934

1,984,741

UNITED STATES PATENT OFFICE 1,984,741

FLOAT OPERATED VALVE FOR OIL WELLS

Thomas W. Harrington, Kevin, Mont.

Application March 28, 1933, Serial No. 663,221

1 Claim. (Cl. 251—83)

This invention relates to a float operated valve for oil wells, the general object of the invention being to provide means for preventing gas from entering the tubing during pumping of an oil well.

Another object of the invention is to provide a balanced valve which will properly function through float control, especially in wells carrying gas pressure.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a longitudinal sectional view through the invention, with the interior parts in elevation.

Figure 2 is an enlarged longitudinal sectional view through the upper part of the device.

Figure 3 is a similar view through the lower part of the device.

Figure 4 is an elevation, partly in section, of the valve casing.

Figure 5 is a section on line 5—5 of Figure 3.

Figure 6 is a section on line 6—6 of Figure 3.

Figure 7 is a section on line 7—7 of Figure 1.

Figure 8 is an elevation of the valve.

Figure 9 is a view of the member for connecting the valve operating lever to the float.

Figure 10 is a bottom plan view of the float.

In these drawings, the numeral 1 indicates a bushing which is to be threaded into the bottom coupling of an ordinary well pump and the numeral 3 indicates a barrel or anchor pipe which has its upper end threaded to the lower part of the bushing with its lower end closed by a plug 4. Holes 5 are formed in an intermediate part of the barrel for admitting fluid from the well in which the device is placed. A valve casing 6 is located in the member 3 and a pipe 7 has its lower end connected to the top of the casing 6, with its upper end threaded in the lower part of the bore 8' of the bushing 1. An elongated valve chamber 8 is formed in the casing 6 with its upper end in communication with the pipe 7 and its lower end in communication with a cylinder 9 which is closed at its bottom, as shown at 10. The chamber is formed with the reduced upper and lower portions and an enlarged central portion and the lower ends of the upper and lower portions are formed with seats 11. The casing is also formed with the holes 12 for admitting fluid into the large chamber and with an enlarged opening 13 which communicates with the large chamber and an operating lever 14 passes through the opening 13 and is pivoted to the casing, as shown at 15. An elongated valve member 16 is slidably arranged in the casing and has upper and lower fluted parts 17 passing through the upper and lower reduced portions of the chamber, each fluted part terminating in a valve part 19 for engaging the seats 11 when the valve member 16 is in raised position. Said member 16 is formed with an opening 20 for receiving the rounded inner end of the lever 14 and the outer end of the lever is slotted, as shown at 21, to receive a pin 22 carried by the lower end of a two-part link 23 which has its upper forked end 24 connected to the bottom of a float 25 through means of the lugs 26. Such float has a central opening 27 therein through which the pipe 7 passes so that the float is slidably arranged on the pipe. I prefer to form said float of a cylinder filled with cork rings or the like to prevent the float from collapsing under pressure.

Guides 27' are attached to the pipe 7 for guiding the link 23 and perforations 28 are formed in the top of the barrel 3 to provide vents for gas collecting in the barrel. A slot 29 is formed in the valve casing 6 for the link 23 and a by-pass passage 30 is formed in the valve casing for equalizing pressure on the valve member.

Thus it will be seen that when the fluid in the well is lowered by the pumping operation to a point opposite the float, said float will drop and the lowering motion of the float will rock the lever 14 through the link 23 and thus the valve member 16 will be raised so that the valve parts 19 will engage the seats 11 and thus no gas can pass into the pipe 7 and thus enter the pump. When the liquid in the well reaches a high level again, the float will move upwardly, thus causing the lever 14 to open the valve member 16 so that the liquid entering the valve casing through the openings 12 and 13 can pass into the pipe 7 and thus reach the pump. If desired, the lower extension 17' of the valve member 17 can be weighted to balance extra weight of valve lifter rod 23 when the parts are made of greater length to carry a higher fluid level.

The cylinder 10 serves as a sediment catcher and said cylinder also prevents the double valve assembly from opening farther than desired, and I prefer to make the upper valve parts 17 and 19 of smaller cross sectional area than the lower parts 17 and 19. By using the two valves and providing the by-pass 30, a balanced valve assembly is provided which permits free operation of the device under pressure and this arrangement also prevents the valves from remaining closed by vacuum created by the well pump.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a device of the class described, a vertically arranged casing of elongated form and provided with a longitudinally extending bore which passes from the upper end of the casing through the lower end thereof, upper and lower parts of the walls of the bore forming valve seats, the upper seat being spaced below the upper end of the casing and the lower seat being spaced above the lower end of the casing, an intermediate part of the bore, between the seats, being enlarged to form a chamber, said casing having openings therein leading from the chamber through the side walls of the casing, one of the openings being enlarged, an elongated vertically arranged valve stem slidably arranged in the bore and having upper and lower valve parts thereon spaced from the ends thereof for engaging the seats when the stem is in raised position, said bore having reduced parts engaged by portions of the stem for guiding the stem in its movement, the lower end of the stem extending beyond the lower end of the casing, a lever pivoted in the enlarged opening and having one end engaging the stem, and a tube threaded in the lower end of the bore and having its lower end closed, with the extended lower end of the stem passing into the upper part of the tube, the upper end of the tube being engaged by the lower valve part for limiting downward movement of the valve stem, and said casing having a vertically arranged by-pass therein having its ends connected with the bore, the upper end communicating with the bore above the upper valve seat and the lower end with the bore below the lower valve seat.

THOMAS W. HARRINGTON.